(12) United States Patent
Van Ryzin

(10) Patent No.: US 6,393,430 B1
(45) Date of Patent: *May 21, 2002

(54) METHOD AND SYSTEM FOR AUTOMATICALLY RECORDING MUSIC DATA FILES BY USING THE HARD DRIVE OF A PERSONAL COMPUTER AS AN INTERMEDIATE STORAGE MEDIUM

(75) Inventor: John M. Van Ryzin, Madison, NJ (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,681

(22) Filed: May 8, 1998

(51) Int. Cl.[7] .............................................. G06F 17/30
(52) U.S. Cl. ...................... 707/104; 707/102; 709/217; 345/339; 345/352
(58) Field of Search ................................. 707/200, 102, 707/104, 10; 369/30, 29; 345/339, 146, 352; 709/217

(56) References Cited

U.S. PATENT DOCUMENTS

| | | | |
|---|---|---|---|
| 4,141,039 A | 2/1979 | Yamamoto | 358/127 |
| 4,870,515 A | 9/1989 | Stokes | |
| 5,191,645 A | 3/1993 | Carlucci et al. | 395/159 |
| 5,218,672 A | 6/1993 | Morgan et al. | 395/162 |
| 5,307,456 A | 4/1994 | MacKay | 395/154 |
| 5,379,153 A | 1/1995 | Ishii et al. | 360/27 |
| 5,471,442 A | 11/1995 | Shimizume | 369/32 |
| 5,502,573 A | 3/1996 | Fujinami | 358/339 |
| 5,508,983 A | 4/1996 | Nakamura et al. | 369/32 |
| 5,548,327 A | 8/1996 | Gunday et al. | 348/97 |
| 5,592,511 A * | 1/1997 | Schoen et al. | 375/220 |
| 5,596,558 A | 1/1997 | Arataki et al. | 369/53 |
| 5,598,391 A | 1/1997 | Mukawa | 369/54 |
| 5,623,465 A | 4/1997 | Sasaki et al. | 369/44.32 |
| 5,633,839 A * | 5/1997 | Alexander et al. | 369/30 |
| 5,668,788 A * | 9/1997 | Allison | 369/30 |
| 5,740,134 A * | 4/1998 | Peterson | 369/30 |
| 5,751,672 A * | 5/1998 | Yankowski | 369/30 |
| 5,793,366 A * | 8/1998 | Mano et al. | 345/329 |
| 5,815,471 A * | 9/1998 | Mince et al. | 369/30 |
| 5,864,868 A * | 1/1999 | Contois | 707/104 |
| 5,900,830 A * | 5/1999 | Scheffler | 341/123 |
| 5,925,843 A * | 7/1999 | Miller et al. | 84/609 |
| 5,949,688 A * | 9/1999 | Montoya et al. | 700/235 |
| 5,974,004 A * | 10/1999 | Dockes et al. | 369/30 |
| 5,990,884 A * | 11/1999 | Douma et al. | 345/327 |
| 6,026,062 A * | 2/2000 | Johnson | 369/33 |

OTHER PUBLICATIONS

Breen, C., "Steal this song [Internet Music]", MacWorld, vol. 17, No. 8, Aug. 2000, Abstract Only.*
McCandless, M., "The MP3 Revolution", IEEE Intelligent Systems, vol. 14, No. 3, May 1999, Abstract Only.*

* cited by examiner

*Primary Examiner*—Jean R. Homere
(74) *Attorney, Agent, or Firm*—Harold T. Fujii

(57) ABSTRACT

A method and system for the creation of a custom playlist of various audio/visual tracks that are to be automatically recorded to a storage medium is disclosed. The user communicates with personal computer (PC) software by means of a graphical user interface (GUI). The GUI allows the user to create a custom playlist and to signal the intent that a recording of that custom playlist to a storage medium be made. Once the user has indicated the custom playlist is to be recorded, the software automatically records the custom playlist with no further user interaction required. In this manner, a minimum amount of user interaction is required.

23 Claims, 7 Drawing Sheets

METHOD AND SYSTEM FOR AUTOMATICALLY RECORDING MUSIC DATA FILES BY USING THE HARD DRIVE OF A PERSONAL COMPUTER AS AN INTERMEDIATE STORAGE MEDIUM

CROSS REFERENCE TO RELATED APPLICATIONS

The subject matter of the present application is related to copending U.S. application Ser. No. 09/074,683, filed Oct. 31, 2001 contemporaneously with this application and assigned to Sony Corporation and to Sony Electronics, which is expressly incorporated herein by reference.

FIELD OF THE INVENTION

This invention relates generally to audio/visual recording devices and, more particularly, to a method and system for creating playlists that are automatically recorded to a recording medium.

BACKGROUND OF THE INVENTION

Users of audio/visual products, such as music and video tracks, often desire to record these products on storage mediums for replay at some future time. A person may desire to create a playlist of music tracks from various compact discs (CDs) by recording the music tracks to a minidisc, tape or other recording medium, for instance. Audio/visual products suitable for recording include, but are not limited to, music, video, and movie selections that are available from actual storage devices as well as electronically over the Internet.

The current manner of recording audio/visual products to create a customized playlist is a time consuming, labor intensive task. The user must designate a track and record it before the next track to be recorded can then be designated and recorded. The user, in other words, must both select the track to be recorded and initiate the recording process of that track before the next track to be recorded can be selected. This required interaction means that the user must be available to oversee the entire recordation operation from stop to finish.

Suppose, for example, that a user wishes to record five music selections, with the first selection from a first CD, the second selection from a second CD, the third selection from the first CD, the fourth selection from the first CD, and the fifth selection from a third CD. Prior to recording the first selection, the user would have to place the first CD in the recording device prior to recording the first selection. After recording the first selection, the user would then remove the first CD, insert the second CD into the recording device, record the second selection, and then remove the second CD. The third and fourth selection would be recorded after placing the first CD back into the recording device. Finally, the fifth selection could be recorded only after the user removes the first CD and inserts the third CD into the recording device.

In the above method of creating a custom playlist, a major disadvantage is that in addition to selecting the track to be recorded, the user must also be present for the actual recording of all but the last audio/visual product to be recorded since the user has to initiate each recording operation. This requires the presence of the user for the duration of the entire selection and recording operation so that the user can choose and then record the appropriate product. There therefore exists a need in the art for a user to be able to choose and record desired tracks of audio/visual product to a storage medium for later access with a minimum amount of user interaction and supervision required. In this way, the user can be freed up to engage in more productive and less tedious tasks if so desired.

SUMMARY OF THE INVENTION

It is accordingly an object of the invention to be able to choose and record desired tracks of audio/visual product to a storage medium for later access with a minimum amount of user interaction and supervision required.

Therefore, according to the present invention, a method and system for the creation of a custom playlist of various audio/visual tracks that are to be automatically recorded to a storage medium is disclosed. The user communicates with personal computer (PC) software by means of a graphical user interface (GUI). The GUI allows the user to create a custom playlist and to signal the intent that a recording of that custom playlist to a storage medium be made. Once the user has indicated the custom playlist is to be recorded, the software automatically records the custom playlist with no further user interaction required. In this manner, a minimum amount of user interaction is required.

The methodology for the present invention, through coordination of user interaction with the GUI, creates a custom playlist of audio/visual tracks and automatically records the custom playlist by performing the steps of creating the custom playlist and controlling a recording device to record the custom playlist to a storage medium. A step of creating a local database of track information on a hard drive of the personal computer is performed either simultaneously with or before creating the custom playlist. Creating the custom playlist comprises obtaining information about a plurality of tracks that are available to be added to the custom playlist, selecting one or more tracks of the plurality of tracks to be added to the custom playlist, adding the one or more tracks to the custom playlist by saving an identifier of each track of the one or more tracks to a playlist file, and saving the playlist file.

The system of the present invention that provides for creating the custom playlist of audio/visual tracks and automatically recording the custom playlist comprises the following: a personal computer defined as having a central processing unit, a storage capability, and an information accessing unit for accessing audio/visual tracks; a recording device that receives the custom playlist from the personal computer and records the custom playlist to a storage medium; a communications link between the personal computer and the recording device that enables the recording device to receive the custom playlist from the personal computer; and software that runs on the personal computer that communicates with a user through a graphical user interface to create the custom playlist of audio/visual tracks and to control the recording device to record the custom playlist to the storage medium.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

The present invention describes a method and a system for the creation of a custom playlist of various audio/visual tracks that are to be automatically recorded to a storage medium. The custom playlist is a collection of information tracks capable of being played on a digital audio/visual actuator device, such as a compact disc (CD) player, digital audio tape (DAT) player, VCR, digital visual disc, cassette recorder, the digital visual disc/mini disc (DVD/MD) player, and stereo components such as stereo receivers. Using the present invention, the tracks specified by the user in the custom playlist may be automatically recorded, providing the user with the ability to make custom recordings in a manner that does not require the user to be present for the recording of the custom playlist. Upon creation of the custom playlist, the recording operation is automatic once the user indicates an intent to create the recording; the recording operation does not therefore require any user intervention.

The user accomplishes creation of the custom playlist and recording of the tracks identified in the custom playlist by use of a graphical user interface (GUI) of a personal computer (PC). Through the GUI, the user creates the custom playlist and then initiates the recording procedure of all tracks on the playlist by simply selecting the "record" feature of the GUI.

Figure 1:
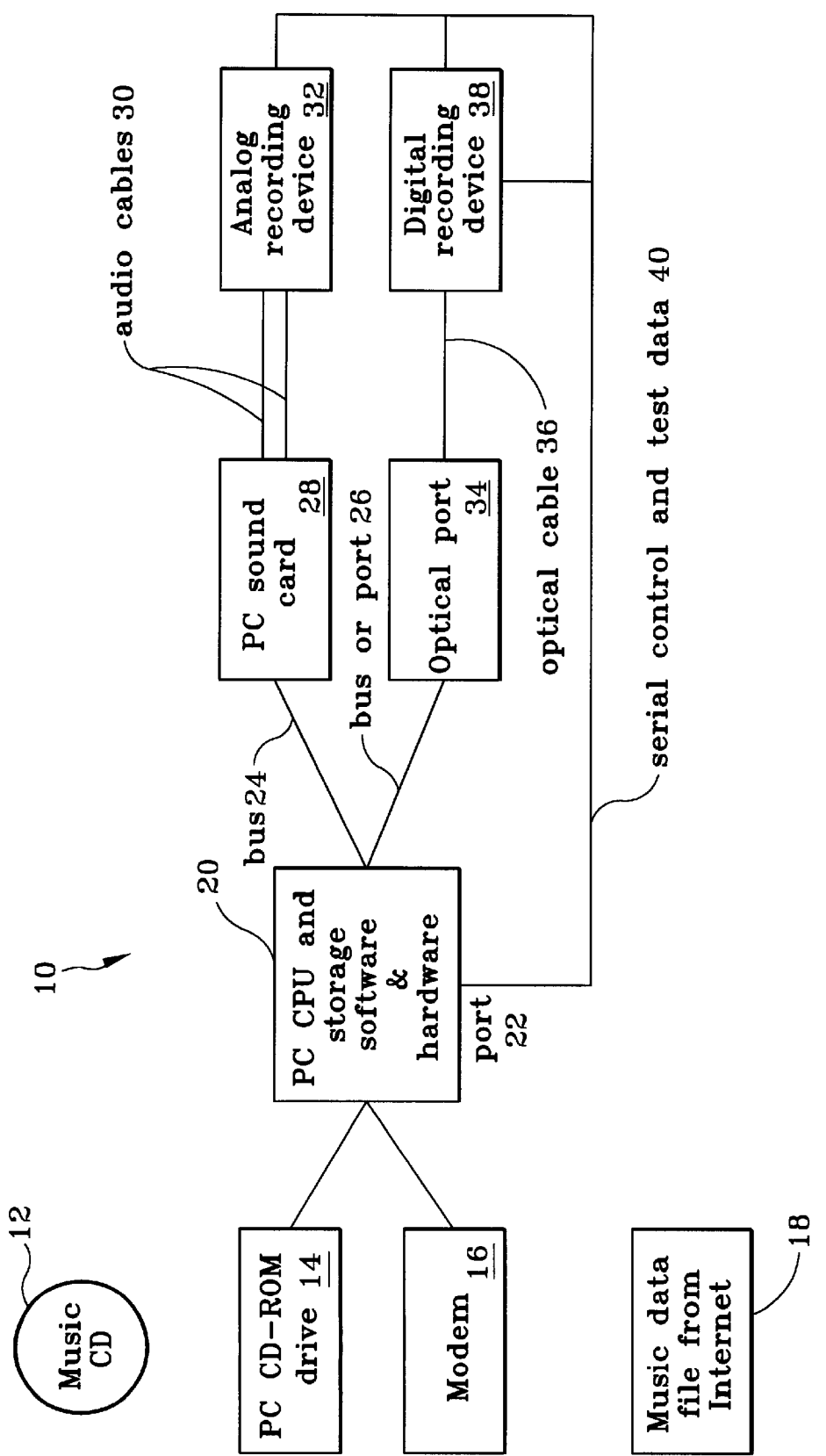
FIG. 1 is a block diagram of a system that allows a user to choose and record desired tracks of audio/visual product to a storage medium for later access, according to the present invention.

The following example of making and then recording a custom music CD playlist will be presented and may be better understood by reference to FIG. 1. A user may make custom recordings, for example, on a minidisc recorder from their own music CD collection, represented by music CD 12, or from music data files 18 that are purchased electronically via the Internet by means of modem 16. To do this, the user creates the custom playlist, a list of music CD tracks, to record through proper interaction with a GUI representation of software resident on the PC central processing unit (CPU) and storage 20; in the case of a music CD 12 as the source medium, the software copies audio track information from the music CD 12 that has been placed in the user's PC CD-ROM drive 14 to the PC's hard drive.

Figure 2:
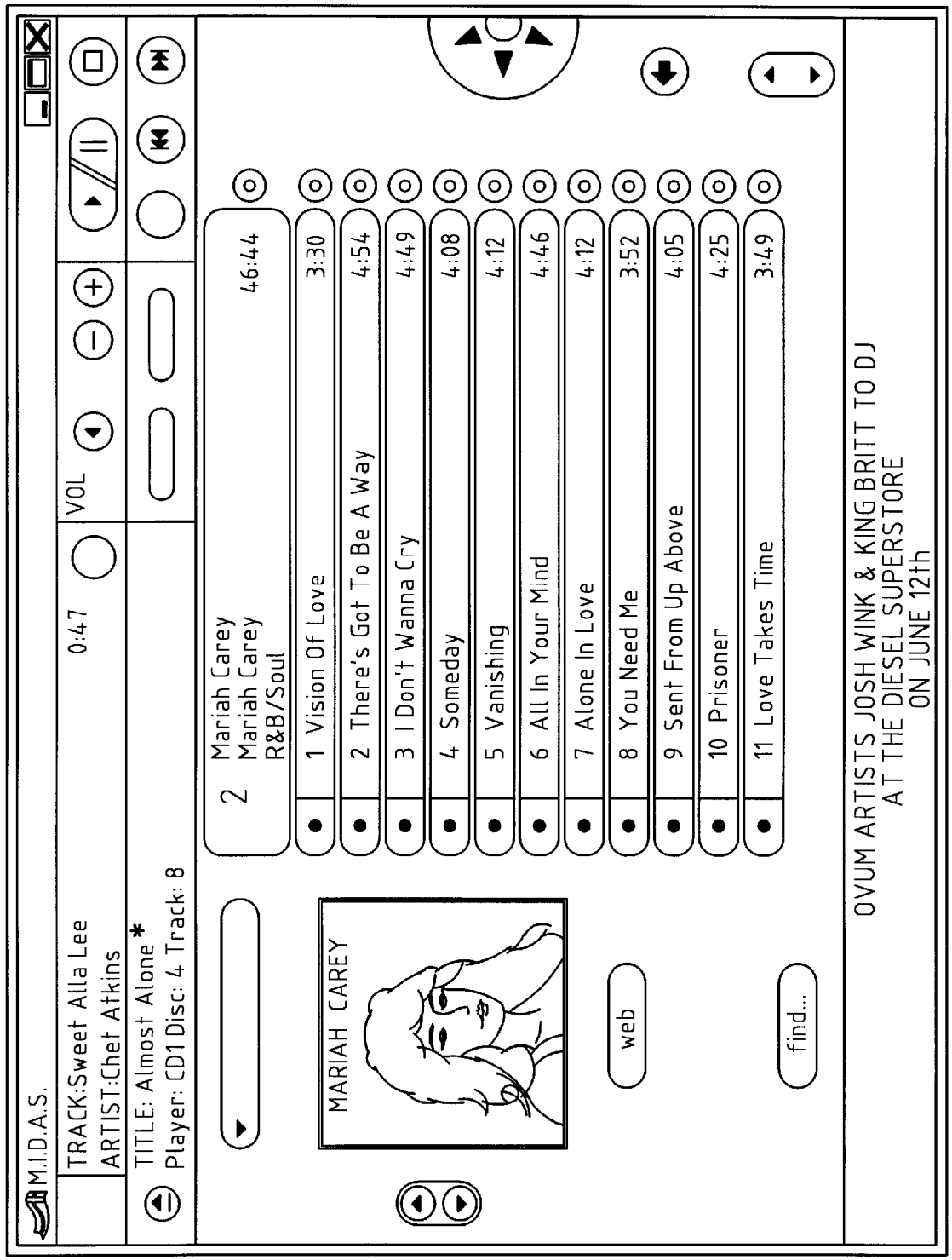
FIG. 2 is an example of a table of contents (TOC) database, as it might appear on a GUI of a PC, according to the present invention.

After prompting the user to insert music CD's 12 into the PC's CD-ROM drive 14, the software reads the CD's table of contents (TOC) in order to present to the user the contents of that CD. For a lower-end application, the TOC will simply indicate the track numbers on the CD. For a higher-grade application, the TOC indicates both the track numbers and the track names. For an even higher-grade application, the TOC will provide the CD cover art in addition to his information. In this way, the software will search for the title and track names on the CD using the TOC in a database file that comes with the software. An example of the TOC database, as it might appear on a GUI of a PC, is illustrated in FIG. 2. It can be seen that the number of tracks, the name and duration of each track, and the CD cover art of each CD is provided to the user.

Before or during the user's creation of the custom playlist, the software creates a local database on the PC's hard drive that represents the user's music collection. This is done using a CD's TOC as an index to a CD title and track text database that is shipped with the software. The database has the title and track names of current CD's in the marketplace. When a new CD is used, this text information will be read from the "text entry" field on the music CD contained in the PC CD-ROM drive 14. In addition, if the CD is not contained in the CD title and track text database and is not "text ready," the software, through the GUI, will allow the user to type in the title and track names manually. In this manner, as new music CD's are placed into the PC CD-ROM drive 14, the software builds up a user's collection database. The title and track information of the custom playlist will be transferred by the software to the recording device via a connection between the PC and the recording device. As shown in FIG. 1, the recording device could be an analog recording device 32 or a digital recording device 38.

Figure 3:
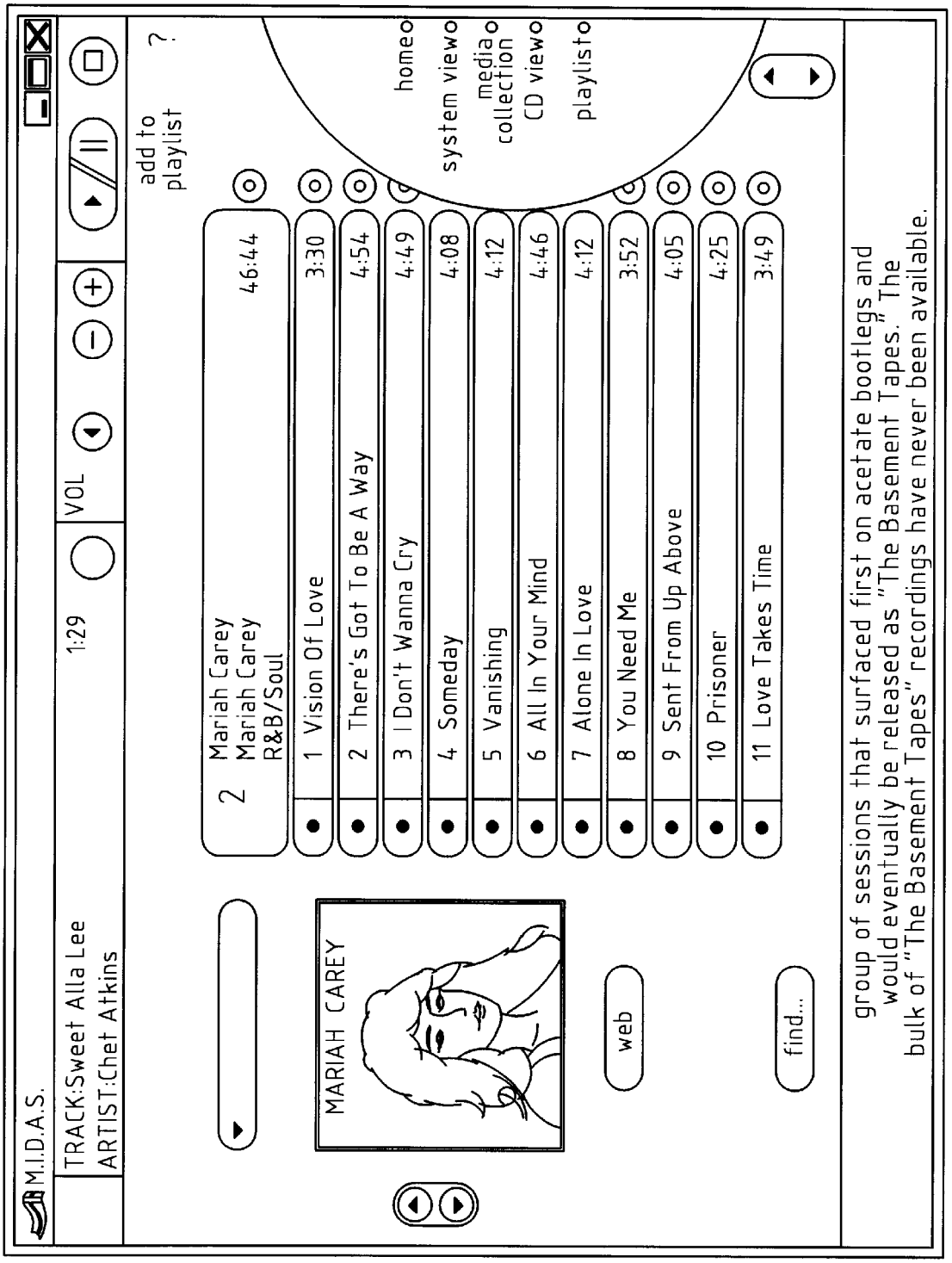
FIG. 3 is a GUI representation of the playlist icon, according to the present invention.

Once a local collection database has been created on the PC's hard drive, the user can make one or more custom playlists from the local collection database for recording. The custom playlists could be saved on the PC and retrieved by the user at a later date. The custom playlist is created on a PC, for instance, by pointing and clicking on icons of a graphical user interface (GUI) that are representative of desired CD tracks, thereby selecting those tracks to be added to the playlist. FIG. 3 provides an example of what the GUI on a PC might look like; in FIG. 3, on the right side of the screen, the icon for selecting the playlist function is clearly shown. Tracks are easily identified by their track index in the TOC of a CD, a database containing the number of tracks and length of each track on the CD. The reader is referred again to FIG. 2 which shows a GUI example of a TOC of a music CD, by way of example. Using the TOC and track index, it is possible to place a certain track of a CD in any position of the custom playlist being created.

Figure 4:
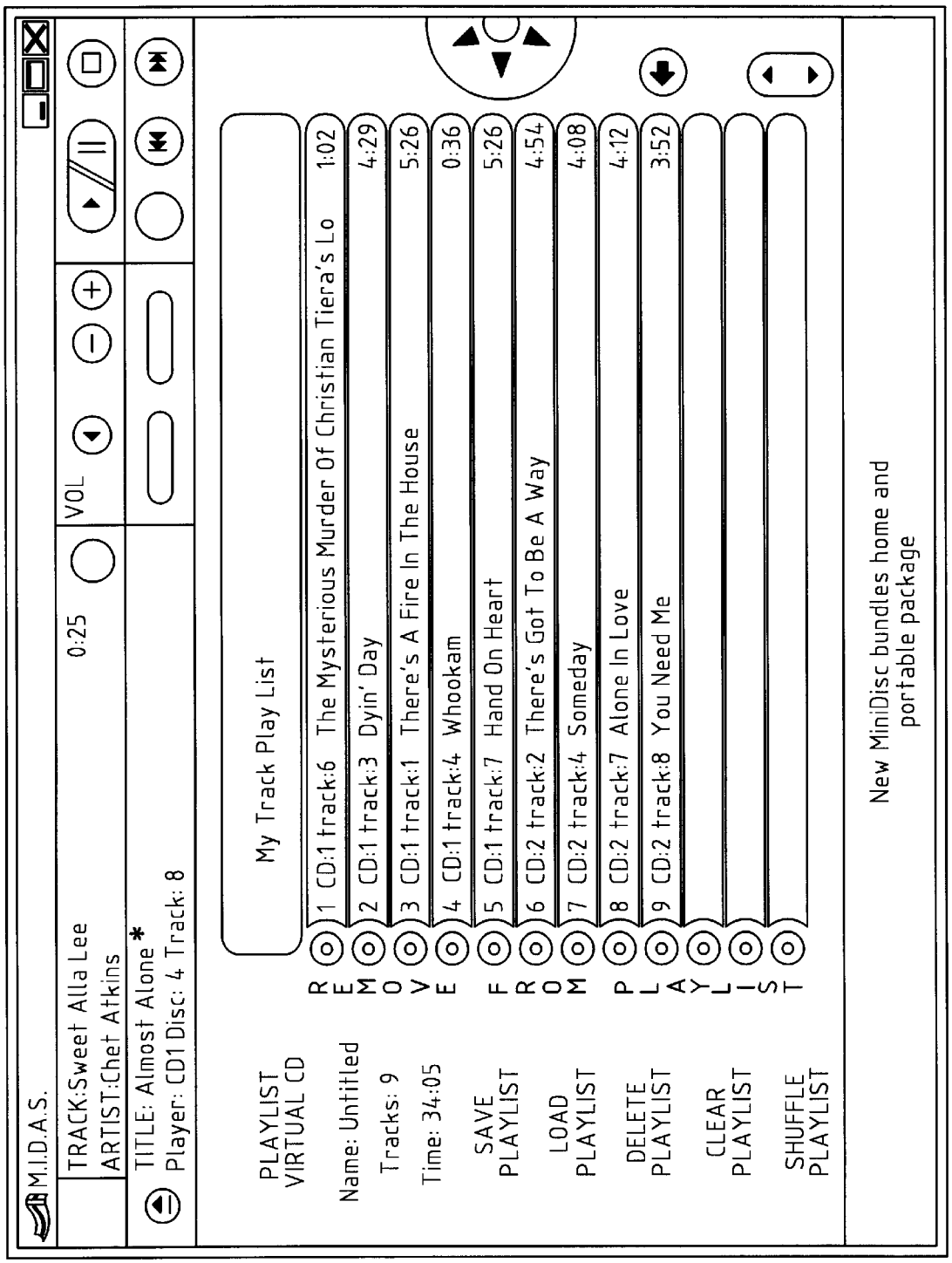
FIG. 4 is a GUI representation of various options available for modifying the playlist, according to the present invention.

Once created, the custom playlist may be modified in a variety of ways. Modification of the playlist may include deleting tracks from the playlist, rearranging tracks in the playlist, and adding tracks to the playlist. Referring to FIG. 4, a sample GUI illustrates the various options for modifying the playlist, including saving, loading, deleting, clearing, or shuffling the playlist.

The software controls a recording device that will record the custom playlist. The recording device may be an analog recording device 32 or an analog recording device 38, both illustrated in FIG. 1. Once the custom playlist has been created, the user can click on record. The user is given the option of having the audio output on the PC be either to a PC sound card 28 or to an optical output cable 36 through optical port 34. If the analog recording device 32 is to be used, the software of PC CPU 20 communicates to PC sound card 28 via bus 24. PC sound card 28 communicates with analog recording device 32 by way of audio cables 30 for tape. If the digital recording device 38 is to be used to record, software communicates to optical port 34 by means of bus or port 26. Optical port 34 communicates to digital recording device 38 by optical cable 36, for minidisc, for instance.

Either analog recording device 32 or digital recording device 38 receive serial control and text data 40 from the software and data files of PC CPU and storage unit.

The software reads the raw audio track data from the CD, compresses it to save hard drive space, and writes them to the hard drive 14. Once an entire playlist is saved to the hard drive 14 and the user selects the record function, the software de-compresses the audio information and writes the data to either the PC's sound card 28 or a PC port 26 that has a LED and fiber optic audio output cable 36. One skilled in the art will recognize that the software could control the recording device 32 or 38 via a serial or a parallel port as well.

Once the creation of the custom playlist is complete and all of the tracks are compiled by software into a single file on the hard drive, the user can click on a "record" function of the GUI and the software automatically starts the recording. Once the user has initialized the record operation, he is then free to walk away until the recording is done. From the user's perspective, this operation appears to be a high-speed dub because they can quickly make a list of tracks for the custom playlist, press record, and not be present while the software automatically completes the recording operation.

As previously mentioned, the user may obtain tracks to be recorded from the Internet. It is therefore envisioned that the software would provide the additional functionality of a browser that would allow the user to purchase music tracks 18 via the Internet connection through modem 16.

Figure 5:
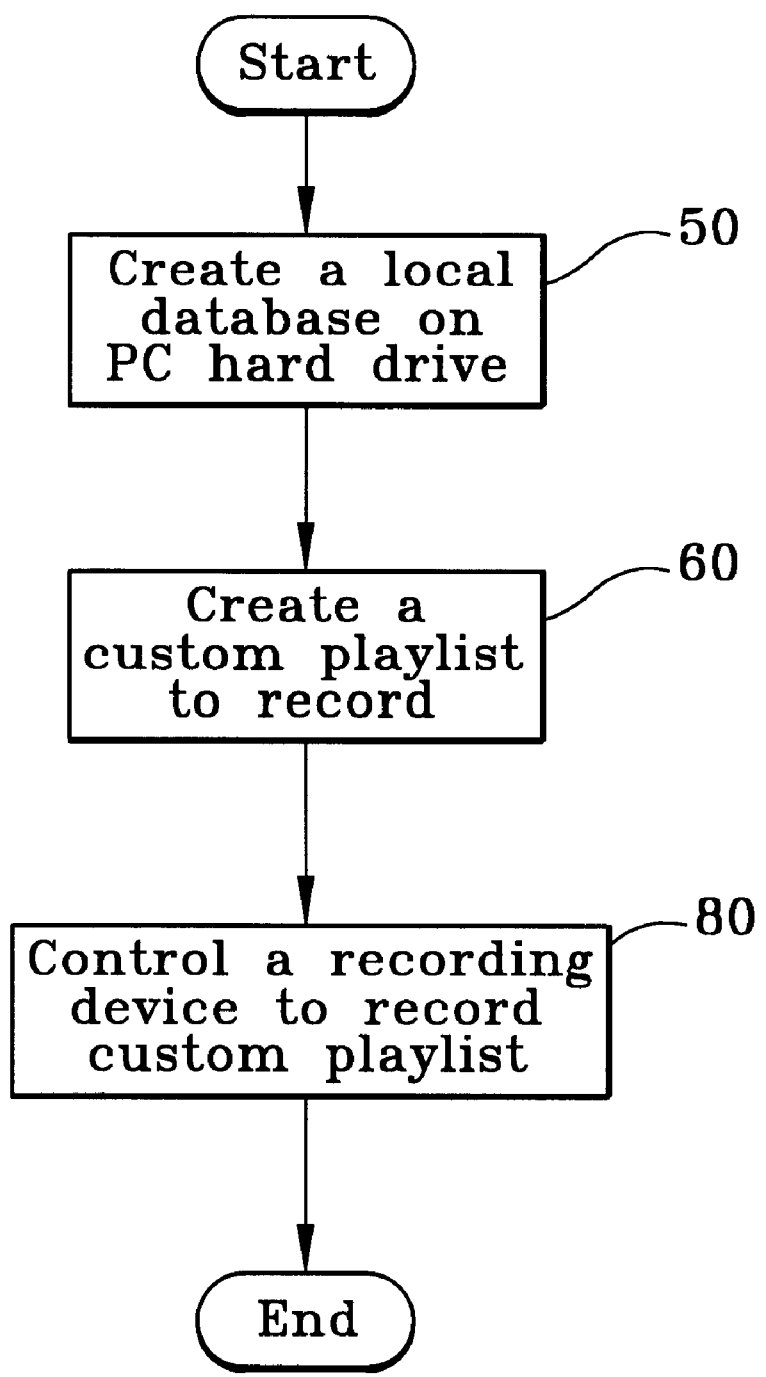
FIG. 5 is an overall flow of the methodology that allows a user to choose and record desired tracks of audio/visual product to a storage medium for later access, according to the present invention.
Figure 6:
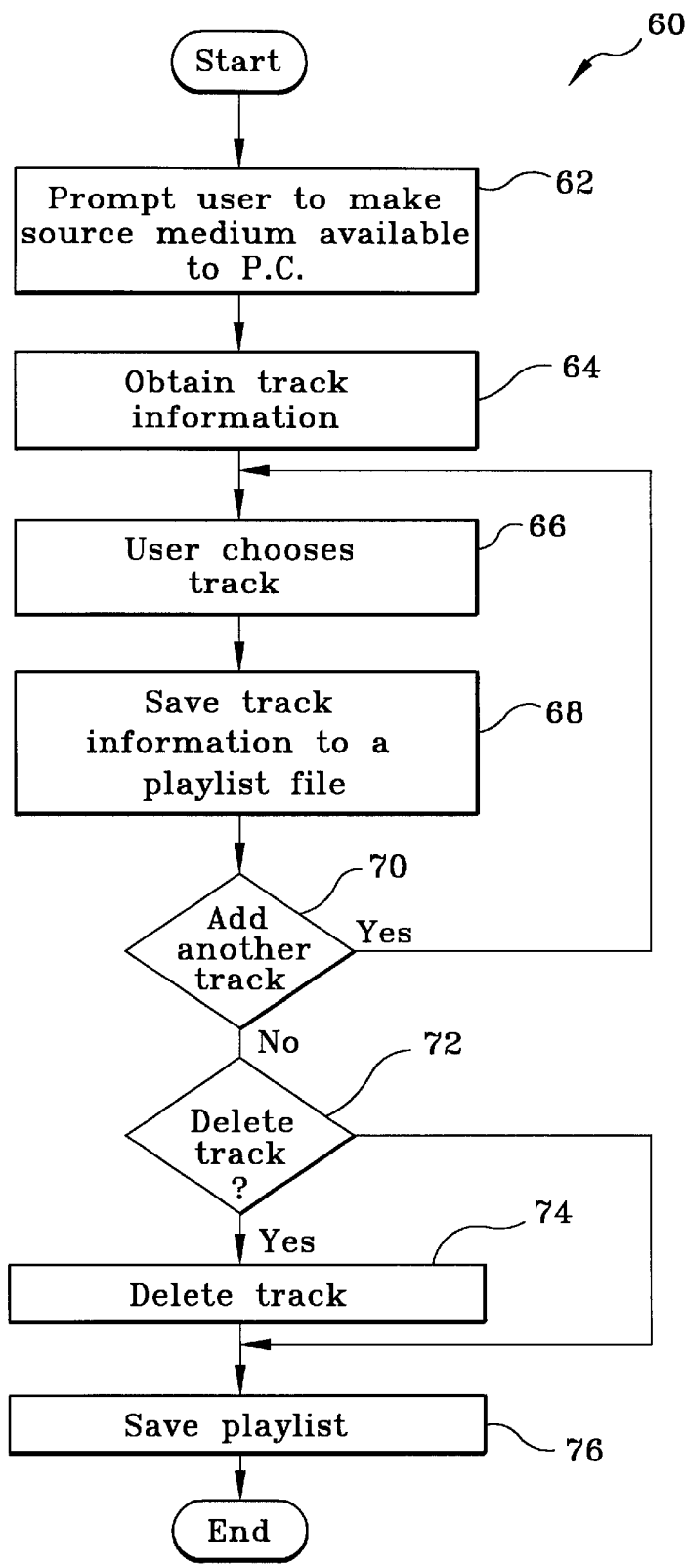
FIG. 6 illustrates the methodology for creating the custom playlist, according to the present invention.
Figure 7:
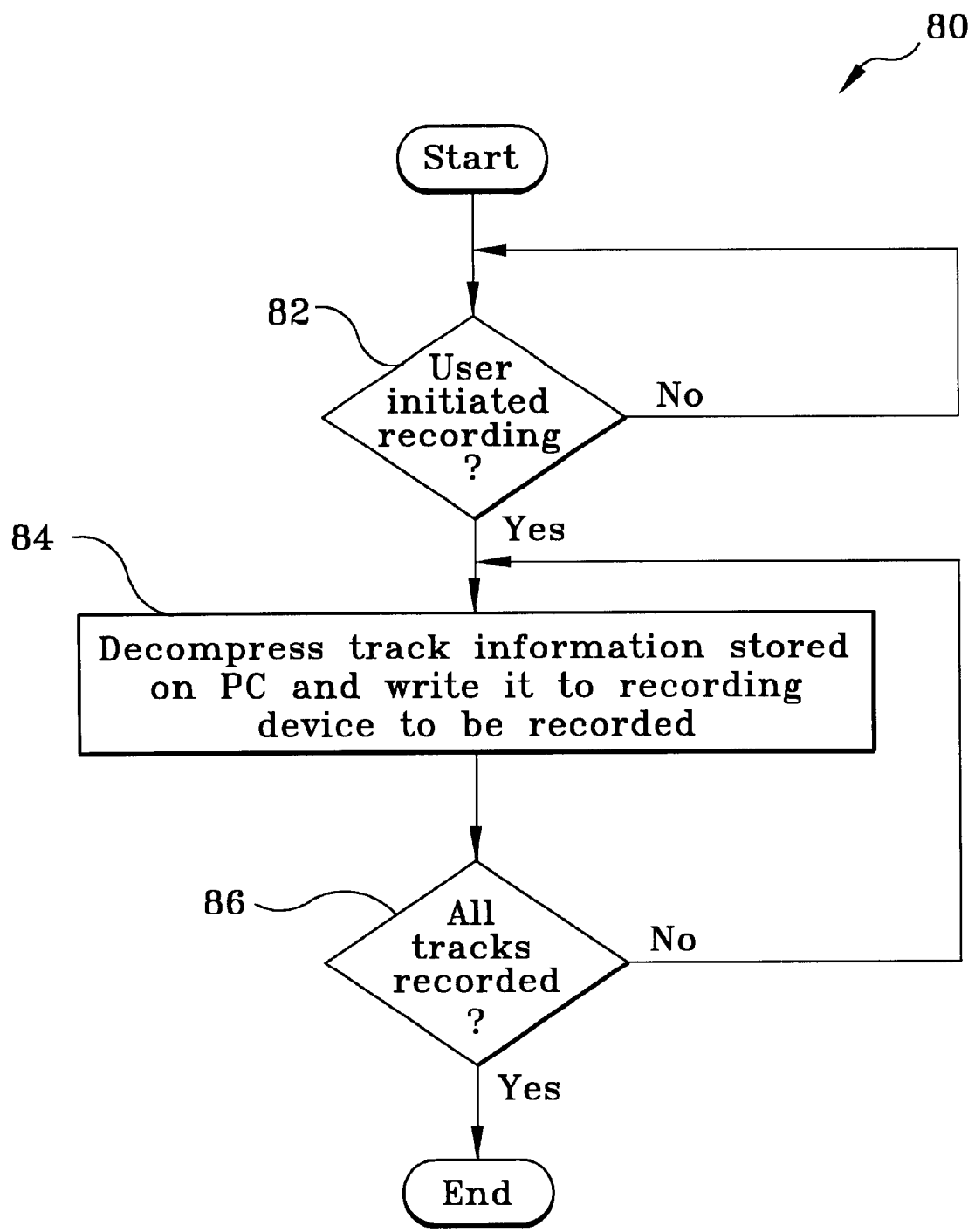
FIG. 7 illustrates the methodology for automatically recording the custom playlist to a storage medium.

This methodology of the present invention for creating and recording a custom playlist is demonstrated by the flowcharts of FIGS. 5–7. Referring to FIG. 5, an overall flow of the present invention is shown. First, at Block 50, the PC software creates a local database on the PC's hard drive of the collection of tracks which are available to the user and from which the custom playlist may be created. Track information from the source medium is copied to the PC storage, the hard drive of the computer. The software reads the raw track data from the storage medium (CD), compresses it, and writes it to the PC hard drive. At Block 60, the user, through communication with the PC GUI creates the custom playlist. This creation process will be further described in FIG. 6. It should be noted that the step of creating a local database on the PC's hard drive identified at Block 50 could be performed before or simultaneous with the creation of the custom playlist in Block 60. Finally, at Block 80 the software controls a recording device to record the tracks identified in the custom playlist to a storage medium. When the user indicates the custom playlist is to be recorded, the track information stored in the PC hard drive is decompressed and written to the recording device.

It should be noted that the track data can be written to the PC hard drive much faster than it can be actually recorded by the recording device. The rate at which the track information is written to the PC hard drive is approximately 24 times or more faster than the same information can be recorded by the recording device. The present invention uses a minimum of user time by copying very rapidly to the PC hard drive track information the user wishes to later copy; when the custom playlist is actually copied by the recording device, the user need not be present and it is therefore not critical that the rate at which the tracks are recorded by the recording device is substantially slower than the rate at which the information was it saved to the PC's hard drive.

Referring now to FIG. 6, the various steps for creating the custom playlist will be described. First, at Block 62 the software prompts the user to make the source medium, from which the track is to be recorded, available. In other words, the track the user wishes to add to the custom playlist must be accessible to the PC. This may take the form of the software GUI prompting the user to place a CD containing the track to be added to the custom playlist in the PC's CD-ROM drive, for instance. Next, information about the source medium and tracks contained therein must be obtained so that it may be accessed by the software as shown in Block 64. Accessing this information includes, in the case of the source medium being a CD, reading the CD's TOC. The user can additionally browse the collection of information available by searching for title and track names using the TOC in a database file that comes with the software. Optionally, the software can read "text ready" track and title text information from the CD or prompt the user to enter title and track names manually through the GUI. Accordingly, when a new source medium, such as a new CD, is used, the text information of the new CD is read from the "text entry" field on the CD in the PC's CD-ROM drive. Additionally, if the CD is not in the database and is not "text ready," the user can manually type in the title and track names. In this manner, the software builds upon the user's collection database.

Next, at Block 66, the user chooses a track to be added to the custom playlist. Information about this track is saved to a playlist file at Block 68. Decision Block 70 inquires as to whether the user wishes to add another track to the custom playlist. If yes, the flow returns to prior to Block 66; if no, the flow continues to Decision Block 72. Decision Block 72 inquires as to whether the user wishes to delete a track of the custom playlist. If so, the track is deleted at Block 74; if not, the flow skips to Block 76. At Block 76 the custom playlist is saved.

Referring to FIG. 7, the methodology for automatic recording 80 of the custom playlist by the PC software is shown. At Decision Block 82, the inquiry is whether the user has initiated recording of the custom playlist. The user would initiate the recording by clicking on a "record" icon of the GUI. If the user has indicated the playlist is to be recorded, at Block 84 the software decompresses the track information of the next track to be recorded and then writes this information to the recording device. The recording device structure and connection is illustrated in FIG. 1. Decision Block 86 ensures that this occurs for each track of the custom playlist. The present invention thus automatically records the custom playlist to a storage medium once the user indicates that the recording operation is to commence.

While the invention has been particularly shown and described with reference to a preferred embodiment, it will be understood by those skilled in the art that various changes in form and detail may be made therein without departing from the spirit and scope of the invention.

What is claimed is:

1. A method of automatically recording audio/visual selections included in a custom playlist, comprising the steps of:

selecting one or more audio/visual selections, including titles and contents, to be added to the custom playlist from at least one source medium;

obtaining information about the selected audio/visual selections;

saving the obtained information for each of the selected audio/visual selection to a playlist file in order to add the selected audio/visual selections to the custom playlist;

modifying the saved information for the selected audio/visual selections in the playlist file in order to manipulate the audio/visual selections in the custom playlist saving the playlist file and the selected audio/visual selections to a storage device of the personal computer; and controlling a recording device that is physically connected to the personal computer to record the selected audio/visual selections included in the custom playlist from the storage device to a recordable medium.

2. The method of claim 1, wherein the step of obtaining information about the selected audio/visual selections comprises reading the table of contents of each source medium that contains an audio/visual selection of the plurality of audio/visual selections.

3. The method of claim 1, wherein the step of obtaining information about the selected audio/visual selections comprises searching a collection of audio/visual selections for title and audio/visual selection names.

4. The method of claim 3, wherein the collection of audio/visual selections is contained in a database file of a personal computer software.

5. The method of claim 3, wherein the collection of audio/visual selections is obtained from an external information source.

6. The method of claim 5, wherein the external information source is the Internet.

7. The method of claim 3, wherein the collection of audio/visual selections is contained in at least one source medium that are accessed by the personal computer.

8. The method of claim 7, wherein the source medium is a compact disc (CD).

9. The method of claim 1, wherein the obtained information contains an identifier which is a track index of an audio/visual selection.

10. The method of claim 1, further comprising the step of:

deleting any audio/visual selection of the custom playlist that is no longer to be in the custom playlist prior to saving the obtained information to a playlist file.

11. The method of claim 1, wherein saving the selected audio/visual selections to the storage device of the personal computer comprises the step of:

creating a local database of audio/visual selection information on a hard drive of the personal computer, wherein the step of creating the local database of audio/visual selection information is performed simultaneously with the step of creating the custom playlist.

12. The method of claim 1, wherein saving the selected audio/visual selections to the storage device of the personal computer comprises the step of:

creating a local database of audio/visual selection information on a hard drive of the personal computer, wherein the step of creating the local database of audio/visual selection information is performed prior to the step of creating the custom playlist.

13. The method of claim 1, wherein a user performs the step of creating the custom playlist by interacting with a graphical user interface (GUI) of software on the personal computer.

14. The method of claim 1, wherein the step of controlling the recording device that is physically connected to the personal computer to record the selected audio/visual selections included in the custom playlist from the storage device to a recordable medium comprises the steps of:

receiving an indication from a user that the custom playlist is to be recorded;

decompressing audio/visual selection information for each audio/visual selection included in the custom playlist; and writing the audio/visual selection information for each audio/visual selection included in the custom playlist to the recording device; and recording each audio/visual selection included in the custom playlist to the recordable medium by the recording device.

15. The method of claim 1, wherein the step of controlling the recording device that is physically connected to the personal computer to record the selected audio/visual selections included in the custom playlist from the storage device to a recordable medium is initiated by a user indicating that the custom playlist is to be recorded.

16. The method of claim 15, wherein the user indicates that the custom playlist is to be recorded by selecting a record icon of a graphical user interface (GUI) of software on the personal computer.

17. A system that provides for automatic recording of audio/visual selections included in a custom playlist, comprising:

a personal computer defined as having a central processing unit, a storage device, and an information accessing unit for accessing available audio/visual selections, including titles and contents of the audio/visual selections, from at least one source medium;

a recording device that receives the audio/visual selections included in the custom playlist from the personal computer and records the audio/visual selections to a recordable medium, the recording device being physically connected to the personal computer;

a direct communications link between the personal computer and the recording device that enables the recording device to receive the audio/visual selections included in the custom playlist from the personal computer; and software that runs on the personal computer that communicates with a user through a graphical user interface to create the custom playlist of audio/visual tracks and to control the recording device to record the audio/visual selections included in the custom playlist to the recordable medium, the software being configured (a) to select one or more audio/visual selections; (b) to obtain information about the selected audio/visual selections, (c) to save the obtained information for each of the selected audio/visual selection to a playlist file in order to add the selected audio/visual selections to the custom playlist; (d) to modify the saved information for the selected audio/visual selections in the playlist file in order to manipulate the audio/visual selections in the custom playlist; and (e) to save the playlist file and the audio/visual selections included in the custom playlist to the storage device of the personal computer prior to controlling the recording device to record the audio/visual selections from the storage device to the recordable medium.

18. The system of claim 17, wherein the information accessing unit for accessing audio/visual selections is a modem of the personal computer.

19. The system of claim 17, wherein the information accessing unit for accessing audio/visual selections is a CD-ROM drive of the personal computer.

20. The system of claim 17, wherein the recording device is an analog recording device.

21. The system of claim 20, wherein the direct communications link is a PC sound card connected to the analog recording device by audio cables.

22. The system of claim 21, wherein the communications link is an optical port connected to the digital recording device by an optical cable.

23. The system of claim 22, wherein the direct communications link is a PC sound card connected to the analog recording device by audio cables.

* * * * *